United States Patent
Kang et al.

(10) Patent No.: US 10,223,839 B2
(45) Date of Patent: Mar. 5, 2019

(54) VIRTUAL CHANGES TO A REAL OBJECT

(71) Applicant: Hewlett-Packard Development Company, L.P., Houston, TX (US)

(72) Inventors: Jinman Kang, San Diego, CA (US); David Bradley Short, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/500,570

(22) PCT Filed: Jul. 31, 2014

(86) PCT No.: PCT/US2014/049319
§ 371 (c)(1),
(2) Date: Jan. 31, 2017

(87) PCT Pub. No.: WO2016/018422
PCT Pub. Date: Feb. 4, 2016

(65) Prior Publication Data
US 2017/0213396 A1  Jul. 27, 2017

(51) Int. Cl.
*G06T 19/00* (2011.01)
*G06T 19/20* (2011.01)
(Continued)

(52) U.S. Cl.
CPC ............... *G06T 19/20* (2013.01); *G06T 7/251* (2017.01); *G06T 19/006* (2013.01); *H04N 5/262* (2013.01);
(Continued)

(58) Field of Classification Search
None
See application file for complete search history.

(56) References Cited

U.S. PATENT DOCUMENTS 7,583,275 B2   9/2009  Neumann et al.
7,599,561 B2  10/2009  Wilson et al.
(Continued)

FOREIGN PATENT DOCUMENTS

CN    1443422     9/2003
CN  102763422    10/2012
(Continued)

OTHER PUBLICATIONS

Raskar, Ramesh, et al. "Shader lamps: Animating real objects with image-based illumination." Rendering Techniques 2001. Springer, Vienna, 2001. 89-102.*
(Continued)

*Primary Examiner* — Ryan M Gray
(74) *Attorney, Agent, or Firm* — Dicke Billig & Czaja PLLC (US LC)—USD

(57) ABSTRACT

A method and system to make virtual changes to a real object is disclosed. Three-dimensional visual data regarding the object is received from a sensor cluster module, which tracks the location and orientation of the object. A three-dimension reconstructed model of the object is created from the visual data. User-selected virtual changes to the object are applied to the three-dimension reconstructed model. A two-dimensional image of the changes to the three-dimensional reconstructed model is projected with a projector onto the object in its current location and orientation.

13 Claims, 3 Drawing Sheets

(51) Int. Cl.
  *H04N 5/262* (2006.01)
  *H04N 9/31* (2006.01)
  *G06T 7/246* (2017.01)

(52) U.S. Cl.
  CPC ......... *H04N 9/3185* (2013.01); *H04N 9/3194* (2013.01); *G06T 2200/08* (2013.01); *G06T 2219/2021* (2013.01)

(56) References Cited

U.S. PATENT DOCUMENTS

| | | | |
|---|---|---|---|
| 7,710,391 | B2 | 5/2010 | Bell et al. |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 9,329,469 | B2* | 5/2016 | Benko ................ G03B 35/00 |
| 2003/0034974 | A1* | 2/2003 | Welch ................ G06T 13/20 345/426 |
| 2003/0034976 | A1* | 2/2003 | Raskar ................ G06T 15/005 345/427 |
| 2003/0038822 | A1 | 2/2003 | Raskar |
| 2005/0078092 | A1 | 4/2005 | Clapper |
| 2005/0102050 | A1* | 5/2005 | Richey ................ G05B 19/401 700/97 |
| 2008/0018591 | A1 | 1/2008 | Pittel et al. |
| 2010/0253700 | A1 | 10/2010 | Bergeron |
| 2011/0205341 | A1* | 8/2011 | Wilson ................ G06F 3/011 348/51 |
| 2011/0242054 | A1 | 10/2011 | Tsu |
| 2011/0292347 | A1 | 12/2011 | Zhang et al. |
| 2012/0212509 | A1 | 8/2012 | Benko et al. |
| 2012/0223909 | A1 | 9/2012 | Tse et al. |
| 2012/0306876 | A1 | 12/2012 | Shotton et al. |
| 2013/0077236 | A1 | 3/2013 | Becze et al. |

FOREIGN PATENT DOCUMENTS

| | | |
|---|---|---|
| CN | 103106604 | 5/2013 |
| CN | 103238338 | 8/2013 |
| KR | 10-2008-0034419 A | 4/2008 |
| KR | 10-2013-0067245 A | 6/2013 |
| KR | 10-2013-0126436 A | 11/2013 |

OTHER PUBLICATIONS

Benko, Hrvoje, Ricardo Jota, and Andrew Wilson. "MirageTable: freehand interaction on a projected augmented reality tabletop." Proceedings of the SIGCHI conference on human factors in computing systems. ACM, 2012.*

Marner, Michael R., et al. "Large scale spatial augmented reality for design and prototyping." Handbook of Augmented Reality. Springer New York, 2011. 231-254.*

Pierre David Wellner, "Interacting with Paper on the DigitalDesk," University of Cambridge, Technical Report, UCAM-CL-TR-330, Mar. 1994, pp. 1-96, No. 330.

Shahram Izadi et al., "C-Slate: A Multi-Touch and Object Recognition System for Remote Collaboration using Horizontal Surfaces,", 2007, pp. 3-10, IEEE.

Bimber, Oliver, et al. "Spatial Augmented Reality: Merging Real and Virtual Worlds", Aug. 8, 2005, CRC press, Available online: https://pdfs.semanticscholar.org/93df/98264280facffec7b646d60dc4d99ef90469.pdf.

Tan, Mengwen, et al. "iSarProjection: A KinectFusion Based Handheld Dynamic Spatial Augmented Reality System." In Computer-Aided Design and Computer Graphics (CAD/Graphics), 2013 International Conference on, pp. 425-426. IEEE, 2013.

Verlinden, Jouke C. et al. "Development of a flexible augmented prototyping system", Journal of WSCG, Vaclav Skala—Union Agency, Plzen, Czech Republic, vol. 11, No. 3, Feb. 3, 2003 (Feb. 3, 2003), pp. 496-503.

* cited by examiner

VIRTUAL CHANGES TO A REAL OBJECT

BACKGROUND

A visual sensor captures visual data associated with an image of an object in a field of view. Such data can include data regarding the color of the object, data regarding the depth of the object, and other data regarding the Image. A cluster of visual sensors can be applied to certain application. Visual data captured by the sensors can be combined and processed to perform a task of an application.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present, disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
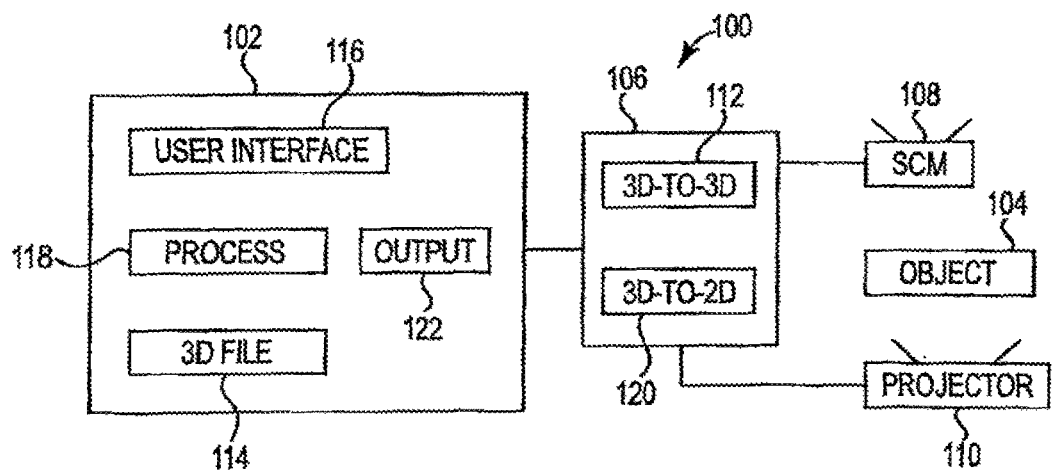
FIG. 1 is a block diagram illustrating an example system of the present disclosure.

FIG. 1 illustrates an example system 100 having a user application 102 to allow users to interact with a real three-dimensional object 104 with closed loop geometric calibrations from a calibration system 106 between visual sensors in sensor cluster module 108 and projector 110. The application 102 provides for real time interaction with the 3D object to illustrate user-selected changes to the 3D object using the projector 110. In one example, user-selected changes to the object can include changing color and adding shapes or alphanumeric characters to the object. The projector 110 can display the changes on the object 104 while the object 104 is stationary and when the object 104 is reoriented or moved with respect to the sensor cluster module 108 and/or the projector 110.

Sensor cluster module 108 provides for 3D scanning of the object 104. Calibration system 106 provides for 3D-to-3D mapping, using a 3D-to-3D mapping module 112, of the scanned object 104 into a 3D reconstructed model. The user application 102 accesses a 3D file 114 corresponding with the 3D reconstructed model. Users via a user interface 116 can manipulate the 3D file 114 with a process 118 of the user application 102. Changes to the 3D file are applied to the 3D reconstructed model via an output module 122. Calibration system 106 can also provide for a three dimensional to two dimensional mapping, using 3D-to-2D mapping module 120, of the changes into a 2D image.

The 2D image is projected onto the object 104 in its present orientation with respect to the sensor cluster module 108 and/or the projector 110. The 3D-to-2D mapping 120 takes into account the shape of the 3D object and thus is likely different than an image of the changes on a 2D surface such as an image of the object on a computer display or on a flat projection screen. The 3D-to-2D mapping also takes into the account the real-time orientation of the object 104 with respect to the sensor duster module 108 and/or projector 110 using information from scanning the object 104. Thus, the image will appear on the changed portion of the object 104 when the object is moved or turned as long as the changed portion is within the field of the projector 110.

Figure 2:
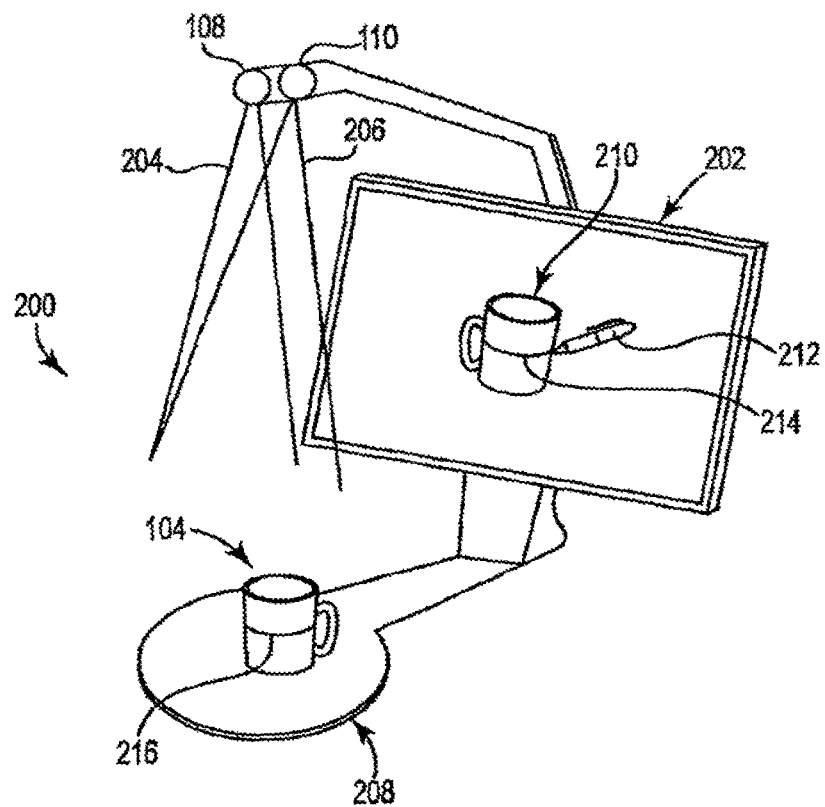
FIG. 2 is a schematic diagram of an example of the system of FIG. 1.

FIG. 2 illustrates a particular example system 200 of system 100 where like parts of FIG. 1 have like reference numerals in FIG. 2. System 200 includes sensor cluster module 108 and projector 110 operably coupled to a computer display 202. The sensor cluster module 108 includes a field of view 204 and the projector 110 also includes a projected image field 206 at least partially overlapping the field of the view 204. Optionally, the system 200 can include a platform 208 within the field of view 204 and image field 206 configured to receive the object 104. In one example, the platform 208 is a turntable that can rotate the object 104 about an axis with respect to the sensor cluster module 108 and projector 110. Object 104 placed within the fields 204, 206 can be scanned and have an image projected onto it. A turntable can rotate the object for scanning and/or rotate the object with respect to the projector 110 in order to properly display the image at the location of the changed portion of the object. In some examples, multiple sensor cluster modules 108 and projectors 110 can be used, or the sensor cluster module 108 and projector 110 can be configured to provide a scan of the object and projection of the image without having to move the object and while the object an any or most orientations with respect to the sensor cluster module 108 and/or the projector 110.

The user application 102 can render an image 210 of a 3D file 114 corresponding with the object 104 on the computer display 202. A user, through a user interface 116, can manipulate the rendered image 210 with tools of the user application 102. In one example, one of the tools is, a virtual pen 212, which can allow a user to make changes 214, such as markings, on the rendered image 210 that can correspondingly alter the 3D file 114. In the illustrated example, the object 104 is a white-colored drinking mug and changes 214 include a line drawn around the circumference of the rendered image 210 of the object 104, e.g., the mug, with the virtual pen 212. The changes 214 to the rendered image 210 can be transformed into the 2D image for projection onto the object 104, e.g., the mug.

The sensor duster module 108 can be used to scan the object 104 and determine its orientation within the field of view 204. The information developed from this scan can be used to determine the location and orientation of the object with respect to the sensor cluster module 108 and/or the projector 110. A continuous scan in time can be used to track the location and orientation of the image if the object is moved with respect to the sensor cluster module 108 and/or the projector 110. The 2D image can be generated with reference to the 3D reconstructed model to properly display an image of the change 216, i.e., the line around the circumference, onto the object 104 in real-time even if the object is moved within the fields 204, 206 with respect to the sensor cluster module 108 and/or the projector 110.

User application 102 is a form of an augmented reality application. Augmented reality is a live direct or indirect view of a physical, real-world environment whose elements are augmented or supplemented by computer-generated sensory input such as images, video, graphics or other data. The user application 102 enhances a current perception of reality. Augmentation can be in real-time and in semantic context with object 104 as the sensor cluster module 108 captures visual data related to the object and the calibration system 106 processes that information into a 3D reconstructed model. User-selected artificial or virtual information can be overlaid on the object 104 with the projector 110.

Sensor cluster module 108 can include a set of heterogeneous visual sensors to capture visual data of an object a field of view of the module 108. In one example, the module 108 includes one or more depth sensors and one or more color sensors. A depth sensor is a visual sensor used to capture depth data of the object. In one example, depth generally refers to the distance of the object from the depth sensor. Depth data can be developed for each pixel of each depth sensor, and the depth data is used to create a 3D reconstructed model of the object. Generally, a depth sensor is relatively robust against effects due to a change in light, shadow, color, or a dynamic background, or other interference produced by the projector 110. A color sensor is a visual sensor used to collect color data in a visible color space, such as a red-green-blue (RGB) color space or other color space, which can be used to detect the colors of the object 104 and an image produced by the projector 110. In one example, a depth sensor and a color sensor can be included a depth camera and color camera, respectively. In another example, the depth sensor and color sensor can be combined in a color/depth camera. Generally, the depth sensor and color sensor are configured to have overlapping fields of view. In one example, a sensor cluster module 108 can include multiple sets of spaced-apart heterogeneous visual sensors that can capture depth and color data from various different angles of the object 104.

In one example, the sensor cluster module 108 can capture the depth and color data as a snapshot scan to create an image frame. An image frame refers to a collection of visual data at particular point in time. In another example, the sensor cluster module can capture the depth and color data as a continuous scan as a series of image frames over the course of time. In one example, a continuous scan can include image frames staggered over the course of time in periodic or a periodic intervals of time. For example, the sensor cluster module 108 can be used to detect the object and then later to detect the location and orientation of the object while the projector is in operation.

The projector 110 is collocated with the sensor cluster module 108 and can project an image into the overlapping fields of view of the visual sensors. The image can be a still image or a moving image such as a video. In the example, the projector 110 is a type of computer display device configured to project 2D image data as light through a translucent (which includes transparent) lens onto a surface. In one example, the projector 110 projects 2D color data but not depth data. In one example, the sensor duster module 108 is generally fixed with respect to the projector 110 during operation. In another example, the module 108 and projector 110 are movable relative to each other, but in this case the calibration system 106 makes additional calculations to accurately reproduce the 2D image onto the relevant portions of the object 104.

The calibration system 106 is able to;communicate visual data with the sensor cluster module 108 and image date with the projector 110 through a link. In one example, the link can be a wired connection, wireless connection, some combination of wired and wireless connection, or other communication connection. Furthermore, the calibration system 106 can be collocated with the sensor cluster module and the projector or in a remote location either on premises or off premises. In one example, the calibration system 106 can be provided as a cloud service. The 3D-to-3D mapping module 112 and 3D-to-2D mapping module 120 can be in as machine-readable instructions executable on one or multiple processors of a computing system, described below. In other examples, the modules 112, 120 can be implemented as hardware.

Figure 3:
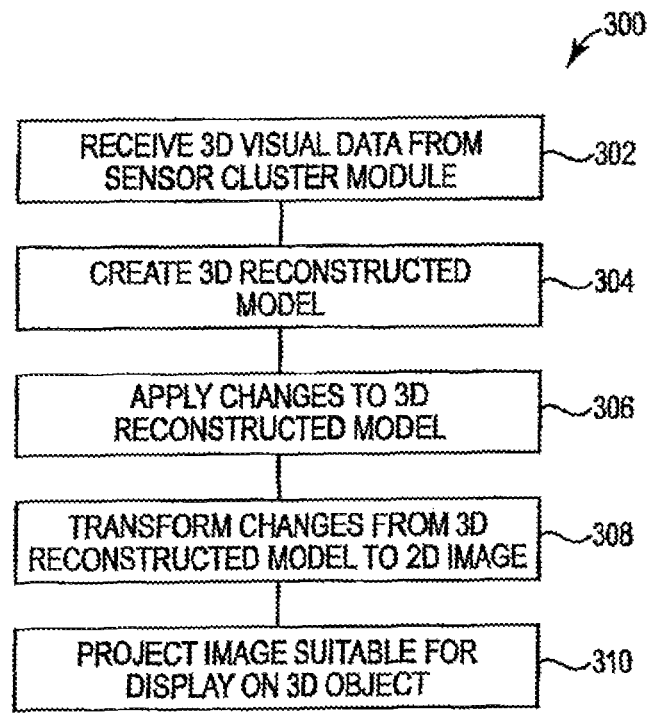
FIG. 3 is a block diagram illustrating an example method that can be performed with the system of FIG. 1.

FIG. 3 illustrates an example process 300 of projecting an image onto an object using the calibration system 106. The calibration system 106 receives visual data, such as depth data and color data, about the object 104 from the sensor cluster module 108 at 302. The calibration system 106 performs a 3D-to-3D mapping of the visual data to create a 3D reconstructed model of the object 104 using a processor and memory at 304. In one example, the visual data is used to determine the current location and orientation of the object 104 with respect to the sensor cluster module 108 and/or the projector 110. A continuous scan can be used to track the local and orientation of the object 104 with respect to the sensor cluster module 108 and for the projector 110. User-selected virtual changes are applied to the 3D reconstructed model at 306. The changes to the 3D reconstructed model are transformed into a 2D image suitable for projecting onto the object 104 at 308. For example, the calibration system performs a 3D-to-2D mapping of the user-selected virtual changes to create a 2D image suitable for projecting onto the object at 308. The 2D image is projected onto the object 104 at 310.

Calibration system 106 includes a 3D-to-3D module 112 to provide for 3D-to-3D mapping of the scanned object 104 into a 3D reconstructed model at 305. In one example of mapping, visual data from the depth sensor is provided in a depth coordinate system and visual data from the color sensor is provided in a color coordinate system. In one example, each pixel of the, scanned object includes a depth/color data pair. Depth data in in the depth coordinate system and color data in the color coordinate system are inputs to a calibration process that applies relevant transformation coefficients in a series of calibration equations to produce the 3D reconstructed model. Other processes for 3D-to-3D mapping, whether now known or yet to be discovered, can be used to create a 3D reconstructed model from the visual data.

Calibration module 106 also includes a 3D-to-2D module 120 can also provide for a 3D-to-2D mapping of changes to a 3D model into a 2D image at 308. In one example, changes to the 3D file can be applied to the 3D reconstructed model, and the changes to the 3D reconstructed model can be, transformed into a 2D image to be provided to the projector 110. The 2D image provided to the projector 110 can simply includes the changes but may include other image data that can be used to affect or enhance the changes. Depth data and color data in the 3D reconstructed model are transformed into the 2D image using a calibration process that applies relevant transformation coefficients in a series of calibration equations to produce the 2D image. Other processes for 3D-to-2D mapping 120, whether now known or yet to be discovered, can be used to create a 2D image from the 3D reconstructed model.

Figure 4:
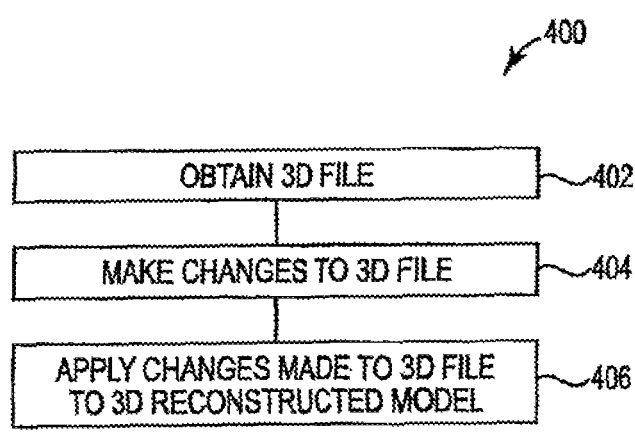
FIG. 4 is a block diagram illustrating another example method that can be performed with the system of FIG. 1.

FIG. 4 illustrates a method 400 of applying user-selected virtual changes to the 3D reconstructed model at 306. The user application obtains a 3D file 114 associated with the object 104 at 402. The user interface 116 receives the user-selected changes and the process 116 applies the user-selected changes to the 3D file 114 at 404 The user-selected changes corresponding with the 3D file are applied to the 3D reconstructed model and provided to the output module 122 at 406.

A number of examples are contemplated for obtaining the 3D file 114 associated with the object 104 at 402. In one example, the 3D file 114 is stored on a storage medium, and retrieved to be operated on with process 118 through user-interface 116. Some of those examples are described here. For instance, a user may simply open up a folder storing the 3D file 114 corresponding with the object 104 and select the 3D file to be operated on by the process 118. In another example, the sensor cluster module 108 can scan the object 104, and use object detection or object recognition to determine the corresponding 3D file 114. In general, a scan of the object 114 to open a 3D file using object detection or recognition can be performed at a resolution lower than that used to create the 3D reconstructed model. In still another example, the sensor cluster module 108 can be used to create the 3D file to be operated on by the process 118. In general a scan of the object to create a 3D file is performed at a resolution generally higher than or the same as the 3D reconstructed model used to track the location and location of the object 104 with respect to the sensor cluster module 108 and/or the projector 110. In examples where the file is opened or created as a result of a scan, the process 118 may interface with the calibration system 106 through an input module (not shown). Other examples can be used.

The user application 102 provides one or more tools to manipulate the 3D file with process 118. The tools can be accessed through user interface 116, and the tools can be applied to the 3D file using input devices such as keyboard, pointing device (e.g., mouse), pen, voice input device, touch input device, or other input device to make changes to the 3D file. Changes to the object depend on robustness of the tool set and can be of any form such as adding, removing, or resizing markings, text, images, portions of the object, altering texture or color of the object, and other changes. In one example, the changes can be saved with the 3D file.

Data regarding the changes, or change data, is provided to the calibration system 106 through the output module 122. In one example, the change data and just enough data regarding the location of the changes with respect to 3D reconstructed file is provided to the calibration system 106. In another example, the entire 3D file with changes can be provided to the calibration system 106, which can process this information along with the 3D reconstructed module to develop an image based on the real-time location of the object with respect to the sensor cluster module 108 and/or the projector 110. Other examples are contemplated.

FIG. 2 illustrates an example of the sensor cluster module 108, projector 110, collocated with a computer display 202 running the user application 102. Other examples are contemplated. For instance, the sensor cluster module 108 and projector 110 can be remote from the computer display 202 running the user application. A user can make changes to a 3D file of an object at one location, and those changes can be projected onto the object located at a remote site with the sensor cluster module 108 and projector. In addition, the changes can be projected at multiple sites having an object in view of the sensor cluster module 108 and in the field of projector 110. In these cases, the objects may be oriented and located with respect to the corresponding sensor cluster modules 108 and/or projectors 110, and the calibration system 106 can take into account the orientation and location of each object. Further, multiple users at remote sites, can, simultaneous make changes to the object, which can be collocated with a sensor cluster module 108 and projector 110. Still further, changes to the 3D file of an object can be made prior to projecting the 2D image onto the object, but the object is still tracked by the sensor cluster module 106 to and the image is projected on the object based on the real-time location and orientation of the object, in one example, the user-selected changes can be made in advance and later projected onto a tracked object at a presentation or other demonstration.

Figure 5:
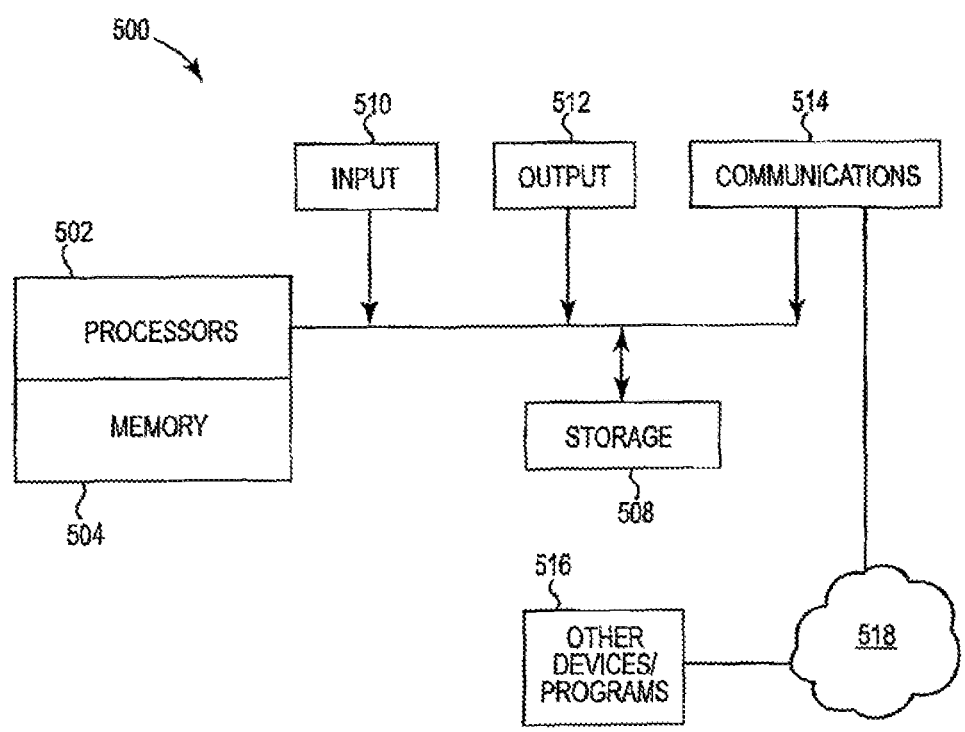
FIG. 5 is a block diagram illustrating an example computer system that can be used to implement the system of FIG. 1 and perform the methods of FIGS. 3 and 4.

FIG. 5 illustrates an example computer system that can be employed in an operating environment and used to host or run a computer application included on one or more computer readable storage mediums storing computer executable instructions for controlling the computer system, such as a computing device, to perform a process. In one example, the computer system of FIG. 5 can be used to implement the user application 102 and its associated processes 300 and 400.

The exemplary computer system of FIG. 5 includes a computing device, such as computing device 500. Computing device 500 typically includes one or more processors 502 and memory 504. The processors 502 may include two or more processing cores on a chip or two or more processor chips. In some examples, the computing device 500 can also have one or more additional processing or specialized processors (not shown), such as a graphics processor for general-purpose computing on graphics processor units, to perform processing functions offloaded from the processor 502. Memory 504 may be arranged in a hierarchy and may include one or more levels of cache. Memory 504 may be volatile (such as random access memory (RAM)), non-volatile (such as read only memory (ROM), flash memory, etc.), or some combination of the two. The computing device 500 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other, Computing device 500 may also include additional storage 508. Storage 508 may be removable and/or non-removable and can include magnetic or optical disks or solid-state memory, or flash storage devices. Computer storage media includes volatile and nonvolatile, removable and non-removable media implemented in any suitable method or technology for storage of information such as computer readable instructions, data structures, program modules or other data. A propagating signal by itself does not qualify as storage media.

Computing device 500 often includes one or more input and/or output connections, such as USB connections, display ports, proprietary connections, and others to connect to various devices to receive and/or provide inputs and outputs. Input devices 510 may include devices such as keyboard, pointing device (e.g., mouse), pen, voice input device, touch input device, or other. Output devices 512 may include devices such as a display, speakers, printer, or the like. Computing device 500 often includes one or more communication connections 514 that allow computing device 500 to communicate with other computers/applications 516. Example communication connections can include, but are not limited to, an Ethernet interface, a wireless interface, a bus interface, a storage area network interface, a proprietary interface. The communication connections can be used to couple the computing device 500 to a computer network 518, which is a collection of computing devices and possibly other devices interconnected by communications channels that facilitate communications and allows sharing of resources and information among, interconnected devices. Examples of computer networks include a local area network, a wide area network, the Internet, or other network.

Computing device 500 can be configured to run an operating system software program and one or more computer applications, which make up a system platform. A computer application configured to execute on the computing device 500 is typically provided as set of instructions written in a programming language. A computer application configured to execute on the computing device 500 includes at least one computing process (or computing task), which is an executing program. Each computing process provides the computing resources to execute the program.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A non-transitory computer-readable medium comprising code which, when executed by a processor, is to cause the processor to:
   receive three-dimensional visual data regarding the object from a sensor cluster module to track a location and orientation of the object, the visual data including both depth data and color data on a pixel-by-pixel basis in a three-dimensional image;
   create a three-dimensional reconstructed model of the object from the visual data, the three-dimensional reconstructed model including both the depth data and the color data;
   apply virtual changes to the three-dimensional reconstructed model;
   transform the changes to the three dimensional reconstructed model into a two-dimensional image of the changes; and
   project the two-dimensional image of the changes with a projector onto the object in the location and orientation.

2. The non-transitory computer-readable medium of claim 1, wherein the code is to cause the processor to track the location and orientation of the object with a continuous scan.

3. The non-transitory computer-readable medium of claim 2 wherein the continuous scan includes a series including a plurality of image frames captured over a course of time.

4. The non-transitory computer-readable medium of claim 1 wherein, to create the three-dimensional reconstructed model, the code is to cause the processor to perform a 3D-to-3D mapping of the visual data.

5. The non-transitory computer-readable medium of claim 4, wherein the code is to cause the processor to apply relevant transformation coefficients in a series of calibration equations to perform the 3D-to-3D mapping.

6. The non-transitory computer-readable medium of claim 1 wherein the location and orientation is a real-time location and orientation.

7. The non-transitory computer-readable medium of claim 1 wherein, to transform the changes into a two dimensional image, the code is to cause the processor to perform a 3D-to-2D mapping of the changes.

8. The non-transitory computer-readable medium of claim 1 wherein the code is to cause the processor to use the three-dimensional reconstructed model to access a corresponding three-dimensional file of the object and to change the three-dimensional file.

9. The non-transitory computer-readable medium of claim 8 wherein the sensor cluster module is collocated with the projector.

10. A non-transitory computer readable medium for storing computer executable instructions, which, when executed, is to cause a processor to:
    receive three-dimensional visual data regarding the object from a sensor cluster module to track a location and orientation of the object;
    create a three-dimensional reconstructed model of the object from the visual data;
    use the three-dimensional reconstructed model to access a corresponding three-dimensional file of the object;
    apply the changes to the three-dimensional file;
    transform the changes to the three dimensional file into a two-dimensional image of the changes; and
    project the two-dimensional image of the changes by a projector onto the object in the location and orientation.

11. The non-transitory computer readable medium of claim 10 wherein a module is configured to receive the three-dimensional visual data regarding the object to track the location and orientation of the object.

12. A system for making virtual changes to a real object, comprising;
    a sensor cluster module collocated with a projector;
    a module to receive and process three-dimensional visual data regarding the object from the sensor cluster module into memory to track a location and orientation of the object, the visual data including both depth data and color data on a pixel-by-pixel basis in a three-dimensional image;
    a module to create a three-dimensional reconstructed model of the object from the visual data, the three-dimensional reconstructed model including both the depth data and the color data;
    a module to apply the changes to the three-dimensional reconstructed model; and
    a module to transform the changes to the three-dimensional reconstructed model into a two-dimensional image of the changes;
    wherein the projector is configured to project the two-dimensional image of the changes onto the object in the location and orientation.

13. The system of claim 12 wherein the sensor cluster module includes a field of view and the projector includes a field of projection, and wherein the field of view overlaps within the field of projection.

* * * * *